(12) United States Patent
Graham

(10) Patent No.: US 11,578,475 B2
(45) Date of Patent: Feb. 14, 2023

(54) PIPE-LAYING SYSTEM AND METHOD

(71) Applicant: DEERE & COMPANY, Moline, IL (US)

(72) Inventor: Brett S. Graham, Dubuque, IA (US)

(73) Assignee: Deere & Company, Moline, IL (US)

( * ) Notice: Subject to any disclaimer, the term of this patent is extended or adjusted under 35 U.S.C. 154(b) by 511 days.

(21) Appl. No.: 16/850,798

(22) Filed: Apr. 16, 2020

(65) Prior Publication Data

US 2021/0324612 A1    Oct. 21, 2021

(51) Int. Cl.
| | |
|---|---|
| *E02F 9/26* | (2006.01) |
| *F16L 1/028* | (2006.01) |
| *E02F 3/96* | (2006.01) |
| *E02F 9/20* | (2006.01) |

(52) U.S. Cl.
CPC .............. *E02F 9/262* (2013.01); *E02F 3/963* (2013.01); *E02F 9/2041* (2013.01); *F16L 1/028* (2013.01)

(58) Field of Classification Search
CPC ......... E02F 9/262; E02F 9/2041; E02F 9/265; E02F 3/963; F16L 1/028; F16L 1/09; F16L 1/10
USPC .......................................................... 701/50
See application file for complete search history.

(56) References Cited

U.S. PATENT DOCUMENTS

| | | | | |
|---|---|---|---|---|
| 4,741,646 A | * | 5/1988 | Hatch | ............... E02F 5/145 405/175 |
| 5,368,413 A | * | 11/1994 | Moore | ................. F16L 1/10 405/184.5 |
| 6,280,119 B1 | | 8/2001 | Ryan et al. | |
| 9,689,145 B1 | | 6/2017 | Fujii et al. | |
| 10,234,368 B2 | | 3/2019 | Cherney | |
| 2004/0197178 A1 | | 10/2004 | Osterloh et al. | |
| 2005/0117973 A1 | | 6/2005 | Nelson | |
| 2005/0135915 A1 | * | 6/2005 | Hall | .................... B66C 1/62 414/739 |
| 2010/0180475 A1 | * | 7/2010 | Ellett | ................ F16L 1/036 37/406 |
| 2015/0233076 A1 | * | 8/2015 | Montgomery | ............ E02D 7/00 405/184.5 |
| 2018/0371721 A1 | * | 12/2018 | Gately | ................ E02F 5/12 |

(Continued)

FOREIGN PATENT DOCUMENTS

| | | |
|---|---|---|
| GB | 2463169 A | 3/2010 |
| WO | 2013166559 A1 | 11/2013 |

OTHER PUBLICATIONS

German Search Report issued in application No. DE102021202139.5 dated Oct. 5, 2021 (06 pages).

*Primary Examiner* — Krishnan Ramesh

(57) ABSTRACT

A pipe-laying system and method includes assessing an environment and placing of a pipe from an excavator to a trench. The system comprises a frame, a boom assembly, and an implement. The boom assembly includes a large boom and a dipper stick. The implement is detachable coupled to the dipper stick and moveable relative to the dipper stick. The system also includes at least one sensor operable to sense a position or a direction of movement of the large boom, dipper stick, or implement. The system also includes a stereo camera to obtain visual data. A controller is adapted to receive the visual data signal, identify an edge of the pipe, receive a signal from the sensor, associate the visual data with corresponding data, create visual feedback and an input signal the position of the boom assembly.

20 Claims, 6 Drawing Sheets

(56) References Cited

U.S. PATENT DOCUMENTS

2019/0077333 A1  3/2019  Abe et al.
2019/0162551 A1  5/2019  Kean
2021/0293355 A1* 9/2021  Renard ..................... F16L 1/09

* cited by examiner

PIPE-LAYING SYSTEM AND METHOD

CROSS-REFERENCE TO RELATED APPLICATIONS

N/A

FIELD OF THE DISCLOSURE

The present disclosure relates to a system and method for pipe-laying with the use of an excavator.

BACKGROUND

Development of new infrastructure and the replacement of aging infrastructure includes laying of a variety of large pipes underground for providing various services through such pipes such for water supply, disposal of rain water from above ground, drainage of sewage to septic tanks or town sewers, natural gas lines, telecommunication, electricity distribution, fiber optics, traffic lights, street lights, storm drains, water mains, and oil lines, to name a few. Many of these pipes, or elongate structures, comprise of a myriad of materials such as cast iron, plastic, galvanized steel, stoneware, asbestos cement, and concrete. Because of the size and weight of such pipes, work machines such as excavators are often used for placement of these pipes in the ground. Such pipes are laid in sections joined to each other, end to end, typically in a trench or other generally confined course of path. The excavator may also be used to generally prepare by digging a trench along the desired path, to a desired depth, and at a desired slope required for the flow of material to pass from pipe to pipe, pipes carrying fluids. Typically, the pipe is supported in the trench by gravel or other fill or bedding material which supports the sides of the pipe, and optionally supports the pipe from underneath.

In the conventional practice of laying a pipe in a trench, the working arm of a work machine such as an excavator, or crane, suspends the pipe section from the working arm for placement in the trench. If coupling of the working arm with the pipe is off-center, the center of gravity of the pipe may not coincide with the point of coupling and the pipe may tilt when lifted off the ground. Furthermore, when the pipe is lifting off the ground, the pipe may swing creating unsteady movement of the pipe. When the pipe is being lowered into the trench, it is placed on the prepared gravel or adjacent to a neighboring pipe for engagement. The engagement structure of the neighboring pipe may be a spigot wherein in precise alignment of the pipe and the neighboring pipe becomes critical. Each of the above-mentioned steps requires the presence of at least one worker in or along the trench for the pipe. Currently, the worker guides the precise position of coupling the working arm to the pipe, guides the pipe when the pipe is being lifted, and further guides the pipe into alignment with a neighboring pipe as it lowered.

A sewer pipe may be, for example, required to be, and to remain, within 0.5 inches of the established running line of the pipes already laid. Concrete sewer pipes can be up to 8 feet long, and can weigh 6 tons or more, thereby settling and compacting loose gravel in the trench. The means of laying such pipes can create a non-optimal environment for safety where communication between the worker in or along the trench and the operator of the work machine may be delayed because of a distracted worker, inconsistent because of an unskilled operator, or be muffled in a loud jobsite. Furthermore, precision of pipe-laying is entirely dependent on the skills of the operator and the worker.

Therein lies a need for an improved system and method for laying pipes, or other elongate pieces, engaged in end-to-end relationship along a path. Another need is to provide a system and method whereby the need of worker in or alongside the trench for routine placement and engagement of such pipes is negligible. Yet another need lies in providing a system capable of gauging the environment and providing improved guidance to an operator.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

A pipe-laying system for assessing an environment and placing of a first pipe relative to a second pipe in a trench is disclosed. The pipe-laying system which may be used with a work machine, may include a frame, a boom assembly, an implement, at least one sensor, at least one stereo camera, and a controller. The frame may be rotatably mounted to a ground-engaging mechanism, the ground-engaging mechanism adapted to support the frame on a surface. The boom assembly may be coupled to the frame. The boom assembly may include a large boom pivotally coupled to the frame and moveable relative to the frame by a first actuator, and a dipper stick pivotally coupled to the large boom and moveable relative to the large boom by a second actuator. The implement may be detachably coupled to the dipper stick and moveable relative to the dipper stick through a third actuator wherein the implement is adapted to detachably engage the first pipe. The at least one sensor may be operable to sense one or more of a position and a direction of movement of one or more of the large boom, the dipper stick, and the implement, thereby creating one or more of a position signal and a direction of movement signal. The at least one stereo camera may be coupled to one or more of the implement, the boom assembly, and the frame wherein the stereo camera may be adapted to obtain a visual data and generate a corresponding a visual data signal. The controller may be adapted to receive the visual data signal from the at least one stereo camera, identify at least one parameter of the first pipe relative to the second pipe, receive one or more of a position signal and a direction of movement signal from the at least one sensor, associate the visual data with one or more of the corresponding position data and direction of movement data, create one or more of a visual feedback to an operator with the at least one parameter of the first pipe relative to the second pipe identified, and an input signal for modification of one or more of the position and the direction of movement of the boom assembly.

The at least one parameter of the first pipe relative to the second pipe may comprise identifying a first edge relative to a second edge.

The at least one parameter of the first pipe relative to the second pipe may comprise identifying a first central axis relative to a second central axis.

The at least one parameter of the first pipe relative to the second pipe may comprise identifying a first centerline relative to a second centerline.

The at least one parameter of the first pipe relative to the second pipe may comprise identifying a first average distance from a trench surface relative to a second average distance from a trench surface.

The at least one parameter of the first pipe relative to the second pipe comprises identifying a first bell end of the first pipe and a second bell end of the second pipe.

The system may also comprise a target signal reader coupled to one or more of the implement, the boom assembly, and the first pipe. The target reader may receive a target signal from a target signal emitter coupled to the second pipe, wherein the target signal reader indicates when the first pipe and the second pipe are in alignment.

The controller may further comprise storage medium adapted to store in memory one or more of the visual data and a corresponding position data with a unique identifier for the first pipe.

The pipe-laying system may further comprise a location-determining receiver. The location-determining receiver may be adapted to generate a location data signal upon positioning of the first pipe wherein the storage medium adapted to store the location data corresponding to the unique identifier for the first pipe.

The pipe-laying system may further comprise a radar sensor coupled to one or more of an implement and a boom assembly, the radar sensor indicating a depth to the surface.

A method of assessing an environment and placing a first pipe relative to a second pipe in a trench by an excavator may include the following steps. The method may include receiving a visual data signal by a controller on the excavator from at least one stereo camera, associating the visual data with one or more of the corresponding position data and the direction of movement data, creating one or more of a visual feedback to an operator with the at least one parameter of the first pipe relative to the second pipe identified and an input signal for modifying one or more of the direction of movement and the position of one or more of the large boom, the dipper stick, and the implement.

The method may also include receiving a target signal by a target signal reader coupled to one or more of the implement, the boom assembly, and the first pipe, from a target signal emitter coupled to the second pipe; sending the target signal to the controller; and creating the input signal for modification of one or more of a direction of movement and position of the boom assembly wherein the target signal indicates the first pipe and the second pipe are in alignment.

The method may also include receiving a depth to the surface signal by the controller from a radar sensor coupled to one or more of the implement and the boom assembly; and creating the input signal for modification of one or more of the direction of movement and the position of the boom assembly based on the depth to the surface signal.

The method may also include generating a location data upon by a location determining receiver upon positioning of the first pipe; and receiving and storing the location data corresponding to a unique identifier for the first pipe by a storage medium.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
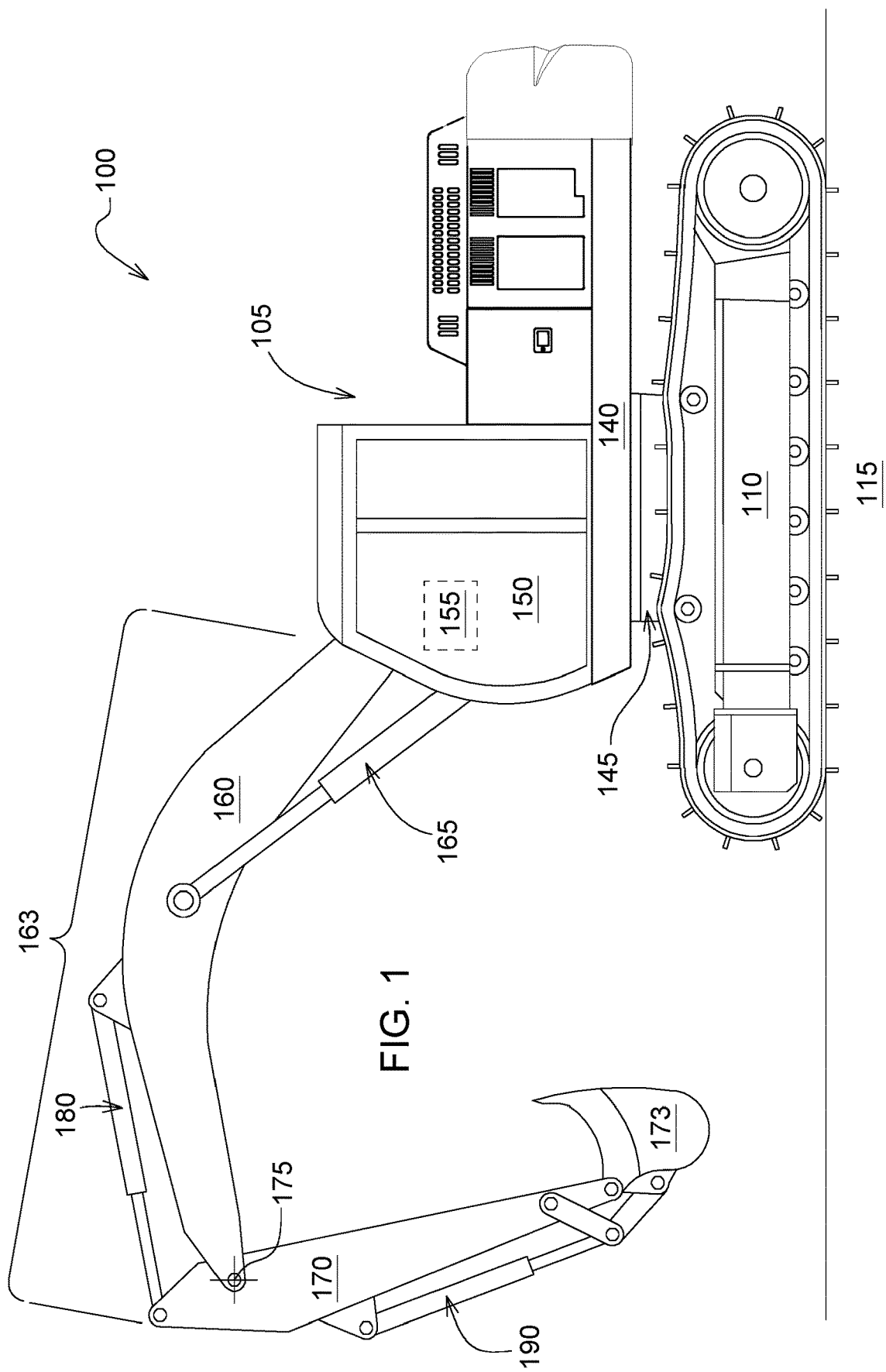
FIG. 1 is a side view of an excavator with the boom assembly.

FIG. 1 illustrates a side view of an excavator 100. The excavator may comprise of a frame 105, a ground-engaging mechanism 110 coupled to the frame 105 and adapted to support the frame 105 on a surface 115. Generally, an upper portion 140 of the frame 115 may be pivotally mounted on an undercarriage 145 by means of a swing pivot. The undercarriage 145 may be coupled to the ground-engaging mechanism 110, wherein the ground-engaging mechanism 110 may comprise a pair of tracks or wheels for moving along the surface. The frame 105 may include an operator cab 150 (although not required for remotely operating an excavator 100) in which the operator controls the excavator 100 through a user input interface 155 (a portion of which is shown in FIG. 4). The user input interface 155 may include control levers, control pedals, buttons, and one or more graphical display screens (also referred to herein as a display 157). A boom 160 may be pivotally coupled to the frame 105. A first actuator 165 may interconnect the boom 160 and the frame 105. The first actuator 165 may be operable to move the boom 160 relative to the frame 105. A dipper stick 170 may be pivotally coupled to the boom 160 for rotational movement about a pivot axis 175. A second actuator 180 may interconnect the dipper stick 170 and the boom 160. The second actuator 180 may be operable to move the dipper stick 170 about the pivot axis 175 relative to the boom 160. An implement 185 may be pivotally coupled to the dipper stick 170. A third actuator 190 may interconnect the implement 185 and the dipper stick 170. The third actuator 190 may be operable to move the implement 185 relative to the dipper stick 170. At least one sensor 195 may be operable to sense one or more of a position 197 (shown in FIG. 2) or a direction of movement 199 (shown in FIG. 2) of one or more of the boom 160, the dipper stick 170, and the implement (173, 185). In one example, the boom assembly 163, comprising of the boom 160 and the dipper stick 170 may be coupled to a bucket-type implement 173 (only shown in FIG. 1) for digging a trench for pipe-laying where the uniformity and grade of the surface 115 in the trench ensures proper pipe-laying. Subsequently, the excavator 100 may exchange implements to one adapted to detachably engage a pipe 185 for pipe-laying (shown in FIG. 3). Various implements adapted to detachably engage a pipe are available. These include, but are not limited to, a sling, a grapple, a magnet, each of which require centering coupling of the implement 185 at or near a center of gravity of the pipe. Coupling at or near a center of gravity of the pipe optimizes stability of transferring an elongate structure (like the pipe).

Figure 2:
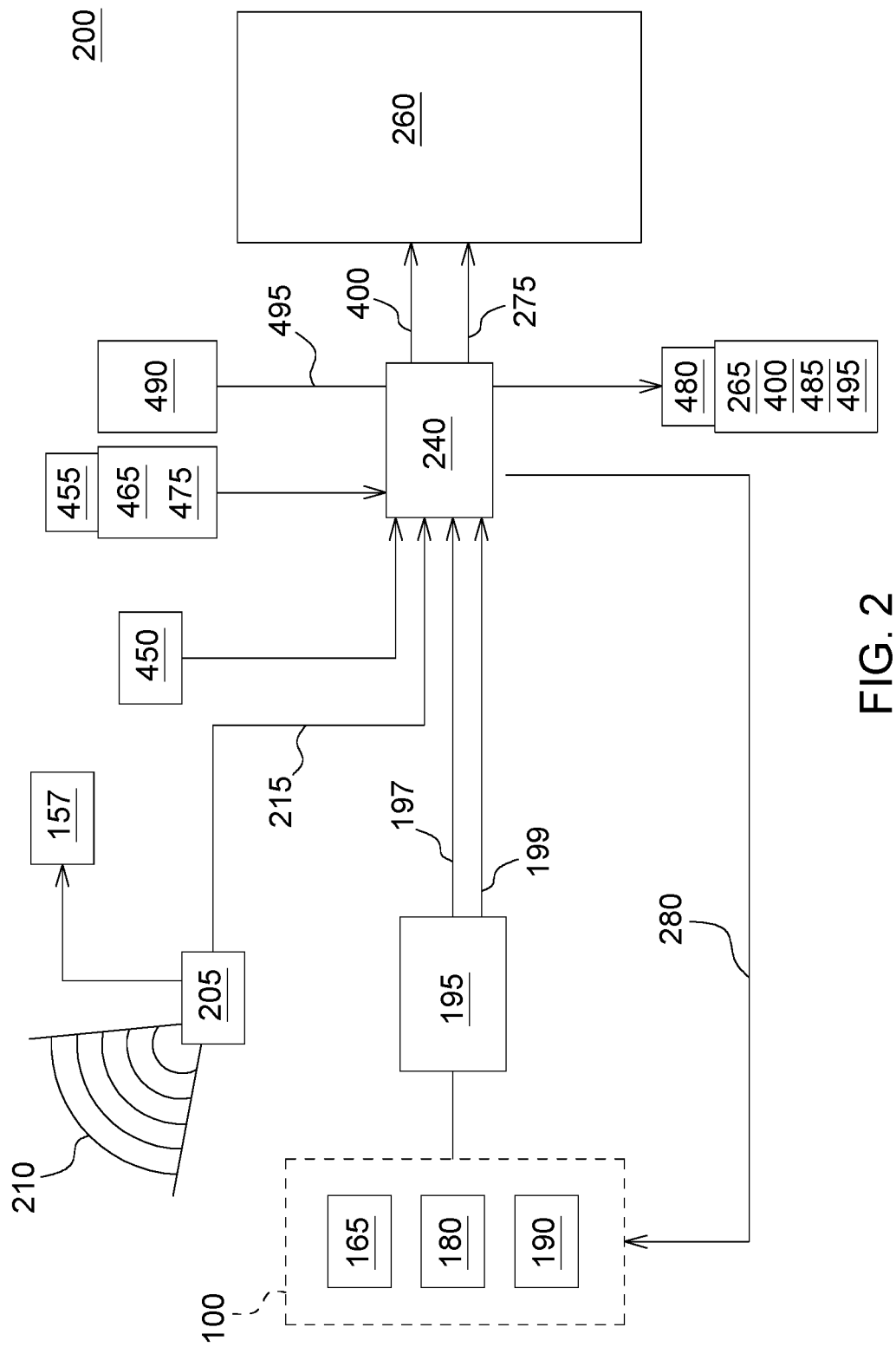
FIG. 2 is a schematic of the pipe-laying system for the embodiment shown in FIG. 1.
Figure 3:
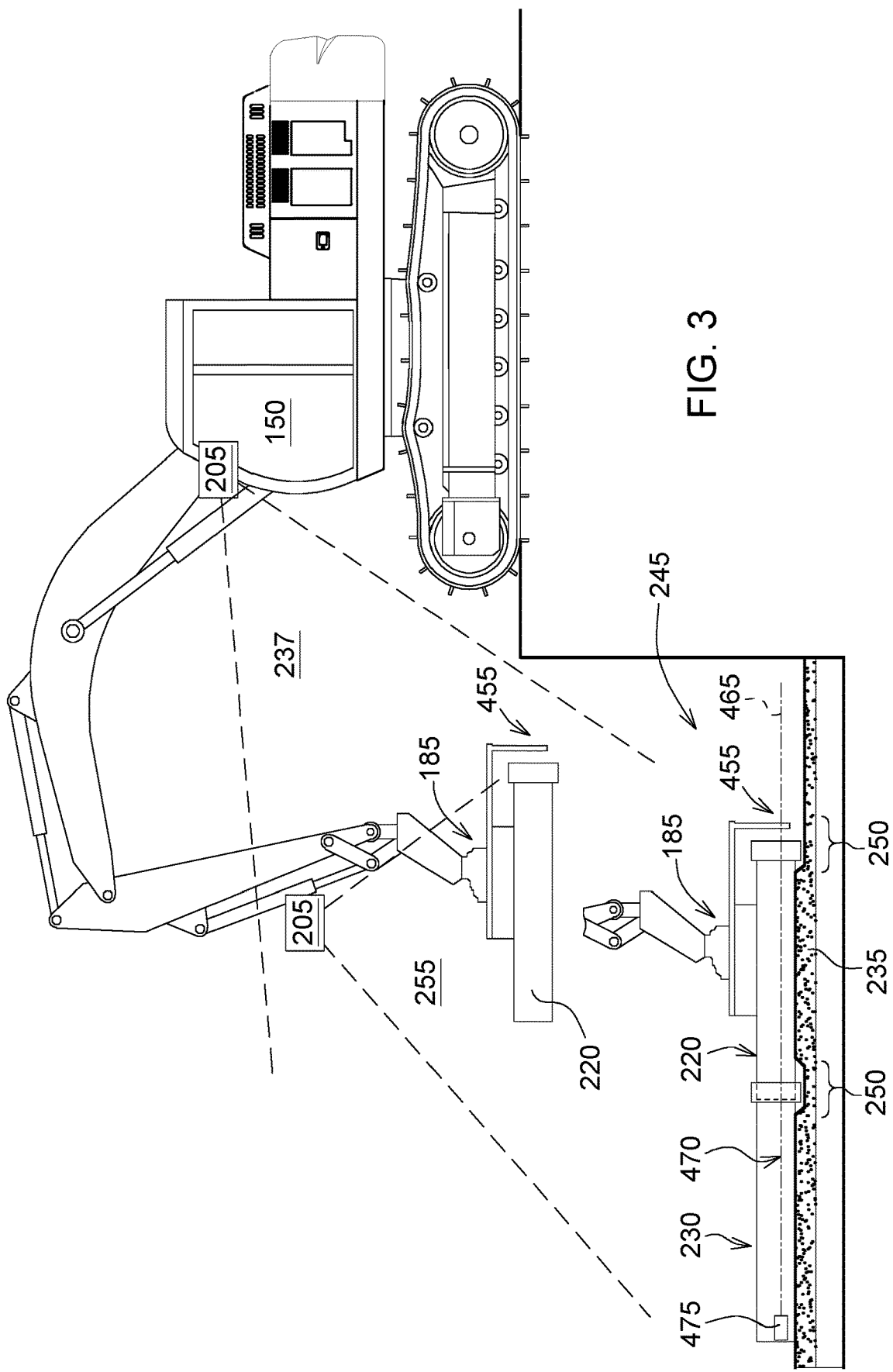
FIG. 3 is a side view of an excavator lowering a pipe into a trench.
Figure 4:
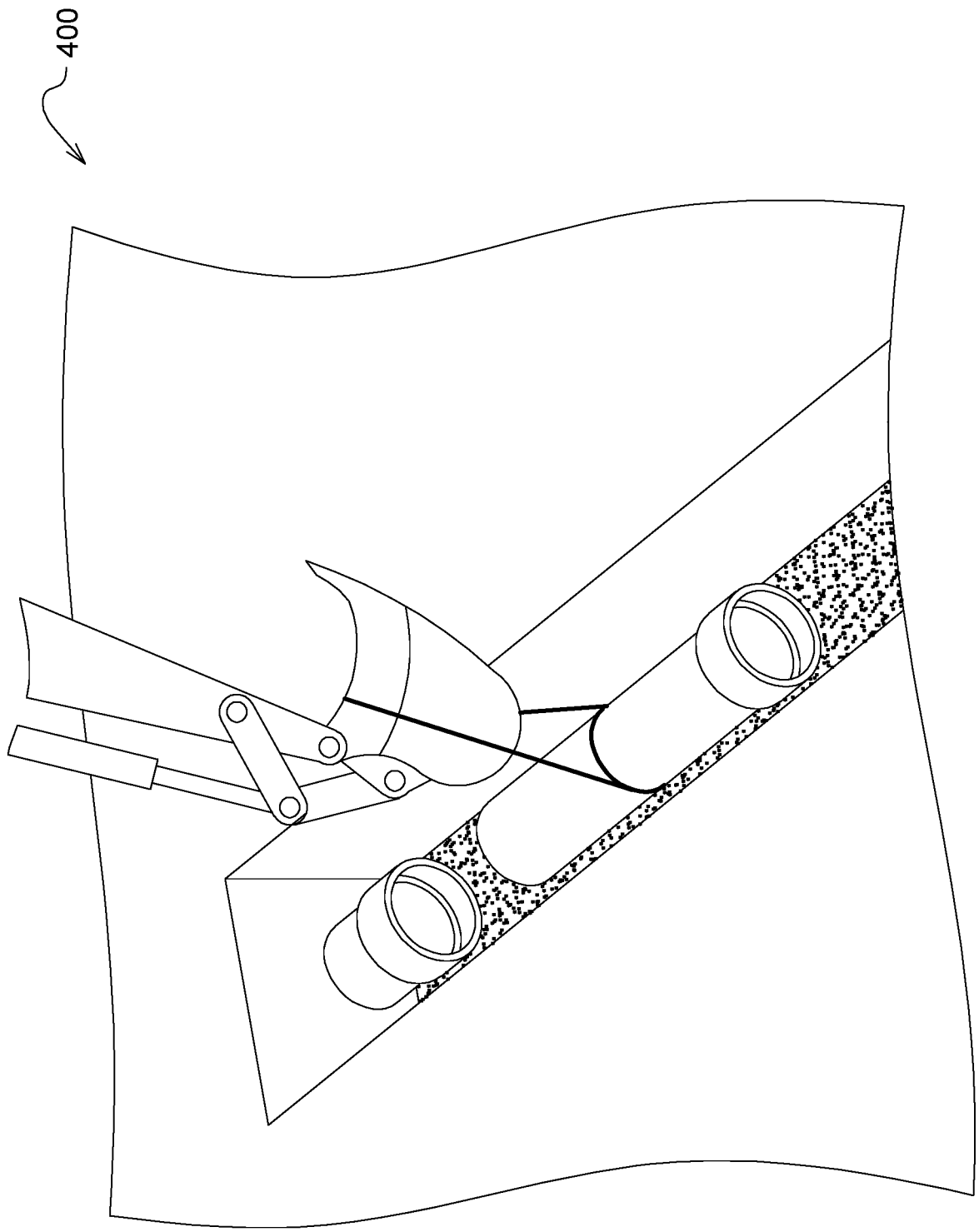
FIG. 4 is an exemplary view of image data as shown on a display of a user input interface.

Now turning to FIGS. 2 and 3 with continued reference to FIG. 1, a schematic of the pipe-laying system 200 for the embodiment shown in FIG. 1 is shown. The pipe-laying system 200 assesses the environment and placement of a pipe from an excavator to a trench 245. The pipe-laying system 200 comprises of a work machine (shown here as an excavator 100) and described above. The pipe-laying system 200 may further comprise at least one stereo camera 205 coupled to one or more of the implement 185, the boom assembly 163, and the frame 105, wherein the stereo camera 205 is adapted to obtain visual data 210 and generate a corresponding visual data signal 215. One or more stereo-cameras 205 may be oriented towards one or more of the first pipe 220 and the second pipe 230; the first pipe 220 referring to the pipe to be positioned in the ground by an excavator 100 and the second pipe 230 refers to a neighboring pipe the first pipe 220 may be coupled to. FIG. 3 demonstrates exemplary positions of the stereo cameras 205 to capture a relative viewing angle and detail of the pipe and its surrounding environment. Placement of the at least one stereo camera 205 on the frame 105 of the excavator 100 enables a steady and fixed position of the stereo camera 205 relative to the frame 105 of the work machine and a constant/steady visual feedback to the operator with a known distance to operator cab 150 where the operator may be seated. Coupling the stereo-camera 205 to the frame 105 further enables a controller 240 to calculate the size and distance of the first pipe 220 from the frame 105 for placement using the visual data 210. Furthermore, coupling of the stereo camera 204 to a frame 105 allows for a high-level view of both the first pipe 220 and the second pipe 230 as shown by the dotted area 237. Visibility of both ends of the first pipe 220, allows capture of visual data 210 to calculate a centerline 425, approximate mid-section (correlating to the approximate center of gravity) of the first pipe.

On the other hand, coupling of the stereo camera 205 to the boom assembly 163 or the implement 185 enables a direct view into the trench 245 thereby providing a real-time visual feedback 275 to the operator during positioning of the first pipe 220 while further allowing the controller 240 to identify other objects within the trench 245 (e.g. utilities, the spigot end of second pipe 230, gravel bed 235, swells 250 for pipe end-to-end placement, to name a few). Coupling of the at least one stereo camera 205 to the boom assembly and/or implement 185 covers exemplary area 255 shown in the dotted in lines.

The pipe-laying system may 200 may include a controller 240 to receive the visual data signal 215 from the at least one stereo camera 205; identify at least one parameter 260 of the first pipe 220 relative to a second pipe 230; receive one or more of a position signal 197 or a direction of movement signal 199 from the at least one sensor 195; associate visual data 210 with one or more of the corresponding position data 265 and the direction of movement data 270; create one or more of a visual feedback 275 to an operator with the at least one parameter 260 of the first pipe 220 relative to the second pipe 230, and an input signal 280 for modification of a direction of movement or position of the boom assembly 163 or implement 185 through actuators (165, 180, 190).

Figure 5:
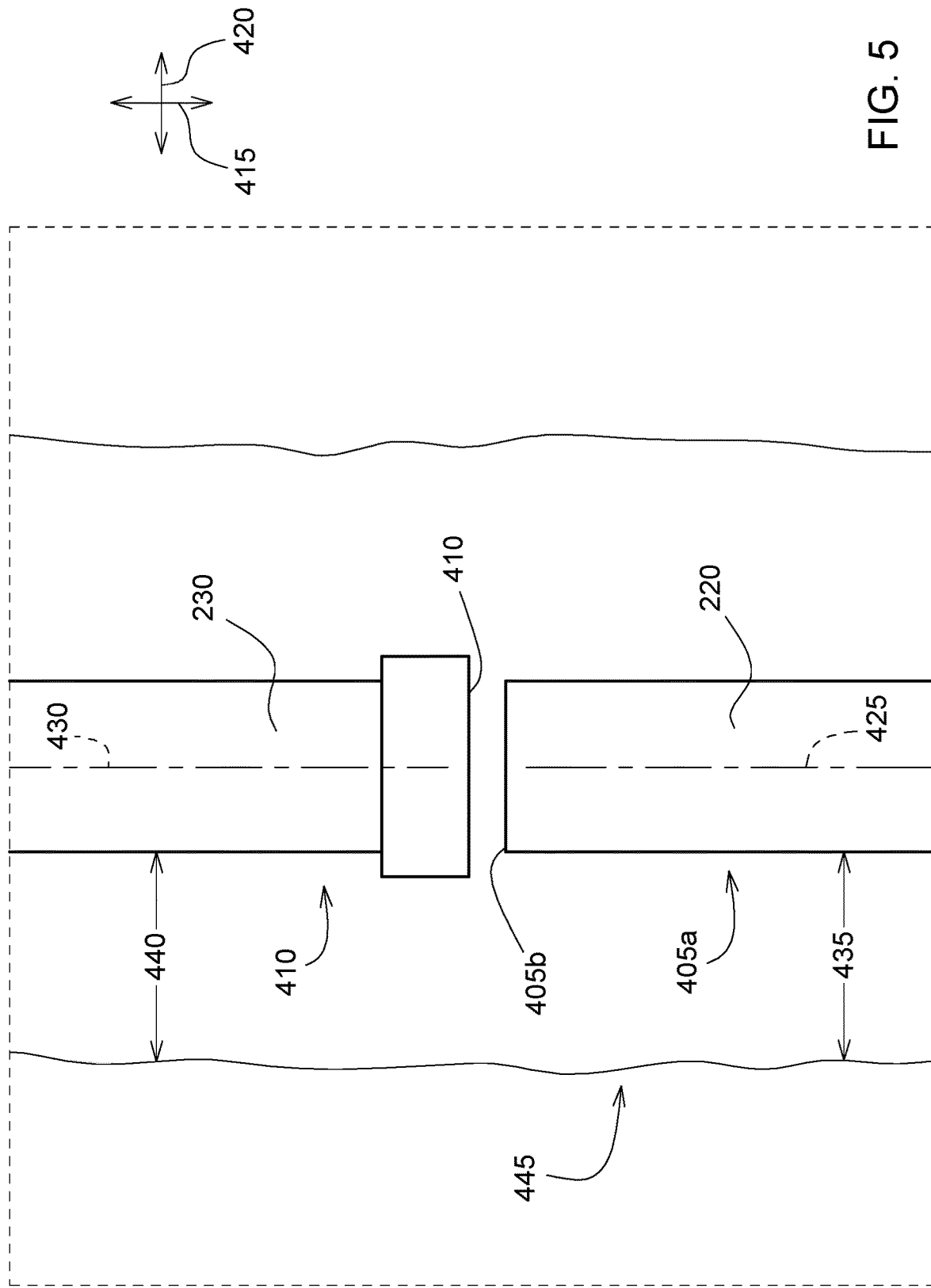
FIG. 5 is an exemplary view of visual feedback on a display of the embodiment shown in FIG. 1.

Now turning to FIGS. 4 and 5, with continued reference to FIGS. 2 and 3, an exemplary view of image data 400 as shown on a display to an operator is shown. FIG. 4 is an exemplary view of image data 400 as shown on a display 157 to an operator.

FIG. 5 is an exemplary display of visual feedback 275 to an operator with the at least one parameter 260 of the first pipe 220 relative to the second pipe 240, in addition to the input signal 280 for modification of a direction of movement 270 or position 265 of the boom assembly 163 (shown in FIG. 2) or implement 185. The at least one parameter 260 of a first pipe 220 relative to a second pipe 230 may comprise of identifying a first edge (405a, 405b) relative to a second edge (410a, 410b). The first edge (405a, 405b) may refer to a first edge (405a, 405b) of the first pipe 220 and the second edge (410a, 410b) may refer to a second edge (410a, 410b) of a second pipe 230. This may be the relative positioning of a first edge 405a and a second edge 410a running in a for-aft direction 415 of the pipes, or alternatively a first edge 405b and a second edge 410b in a left-right direction 420 of the pipes.

The at least one parameter 260 of the first pipe 220 relative to a second pipe 230 may comprise of a first centerline 425 relative to a second centerline 430. The first centerline 425 may refer to the first centerline 425 of the first pipe 220 (e.g. as viewed from a top surface of), and the second centerline 430 may refer to the second centerline 430 of the second pipe 230.

The at least one parameter 260 of a first pipe 220 relative to a second pipe 230 may additionally, or alternatively, comprise of a first average distance 435 from a trench surface 445 relative to a second average distance 440 from a trench surface 445. The distance from a trench surface 445 may be derived from a sidewall as shown in FIG. 5. Alternatively, a distance from a trench surface 445 may be derived from a radar sensor 450 coupled to one or more of the implement 185 and the boom assembly 163 wherein the radar sensor indicates a depth to a surface (e.g. the gravel bed 235 of the trench). This may allow for identifying the swells 250 in the gravel bed 235 for proper pipe placement.

Turning back to FIGS. 2 and 3, the pipe-laying system 200 may further comprise of a target signal reader 455 coupled to one or more of the implement 185, the boom assembly 163, and the first pipe 220 wherein the target signal reader 455 receives a target signal 460 from a target signal emitter 475 coupled to the second pipe 230. The target signal reader may indicate when the first pipe 220 and the second pipe 230 are in alignment. The at least one parameter 260 of a first pipe 220 relative to a second pipe 230 may comprise of identifying a first central axis 465 (shown by the dotted line in FIG. 2) relative to a second central axis 470 (shown the dotted line in FIG. 2). The first central axis 465 may refer to the first central axis 465 of the first pipe 220, and the second central axis 470 may refer to the second central axis 470 of the second pipe 230. The central axes (465, 470) may or may not exactly coincide with the target signal reader 455 and the target signal emitter 475 coupled to said pipes (220, 230). However, the positioning of the target signal emitter 475 and the target signal reader 455 are indicative of alignment of the first pipe 220 and the second pipe 230.

The controller 240 may further comprise a storage medium 480 adapted to store in memory one or more of the image data 400 and the corresponding position data 265 with a unique identifier 485 for the first pipe 220. As used herein, the storage medium 480 comprises electronic memory, non-volatile random access memory, an optical storage device, a magnetic storage device, or another device for storing and accessing electronic data on any recordable, rewritable, or readable electronic, optical, or magnetic storage medium.

The pipe-laying system may further comprise of a location-determining receiver 490 configured to generate location data 495 upon positioning of the first pipe 220 wherein the storage medium 480 is adapted to store the location data 495 corresponding to the unique identifier for the first pipe 220. As used herein, the location-determining receiver 490 may comprise a Global Positioning System Receiver (GPS) or any satellite navigation receiver for providing: (1) position data, elevation data, attitude, roll, tilt yaw, motion data, acceleration data, velocity, or speed data for a vehicle or its components, such as the boom, dipper stick, and implement. For example, the location-determining 490 receiver may comprise a satellite navigation receiver with a secondary receiver or transceiver for receiving a differential correction signal to correct errors or enhance the accuracy of position data from received satellite signals. This compilation of data as each respective pipe is positioned creates an "as built" map for utility as the project progresses. Other data that may be compiled in the storage medium 480 include vendor identification, operator identification, weather, machine identification, material description, bar codes, project identification, startup data, implement identification, to name a few.

Figure 6:
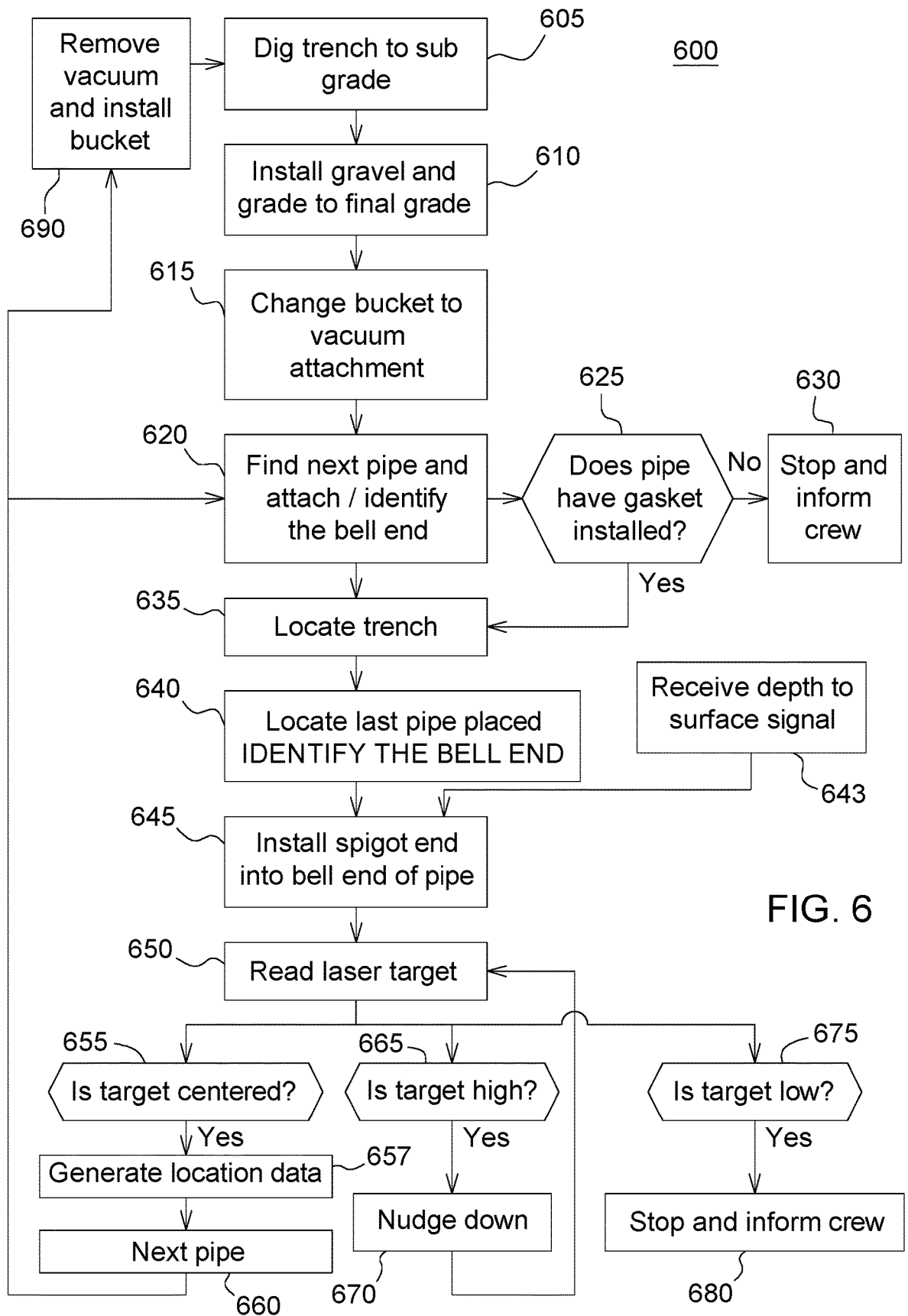
FIG. 6 is a flowchart of a method of pipe-laying for the embodiment shown in FIG. 1.

Now turning to FIG. 6, a method 600 of assessing an environment and placing a first pipe 220 relative to a second pipe 230 in a trench 245 by an excavator 100 is shown. Precursors steps include step 605 of digging a trench 245 to subgrade using a bucket type implement 173; step 615 of installing gravel and grading to final grade; and step 615 of changing from a bucket type implement 173 to an implement for detachably engaging a pipe 185. In a first step 620, the controller 240 on the excavator 100 receives a visual data signal 215 from one or more stereo cameras 205 coupled to one or more of a frame 105, a boom assembly 162, and an implement (173, 185) on the excavator 100. The visual data 210 acquired may comprise viewing a pipe, or pipes with an implement for detachably engaging a pipe coupled to the excavator. At or before the implement 185 engages the pipe 220, the controller 240 may identify at least one parameter 260 of the first pipe 220 relative to the second pipe 230. This may include identifying the bell end (410b) of a pipe wherein the bell end couples with a straight end (405b) of a pipe, thereby orienting the pipe in the correct fore-aft direction 415. The at least one parameter 260 may also include identifying a first edge 405 relative to a second edge 410; and identifying a first central axis 465 relative to a second central axis 470. Upon implement 185 engaging with the pipe, in step 635, the controller may then locate the trench 245, locate the preceding pipe placed, and identify a first average distance 435 from a trench surface 445 relative to a second average distance 440 from the trench surface 445. The controller 240 may then receive one or more of a position signal 197 or a direction of movement signal 199 from at least one sensor 195, the at least one sensor operable to sense one or more of a position or a direction of movement of one or more of the large boom 160, the dipper stick 170, and the implement (173, 185). The controller 240 may then associate the visual data 210 with one or more of the corresponding position data 265 and the direction of movement data 270. The controller 240 may then create one or more a visual feedback 275 to an operator with at least one parameter 260 of the first pipe 220 relative to the second pipe 230 identified (examples of which are discussed above), and an input signal 280 for modifying a direction of movement 199 or position 197 of a boom assembly 163, wherein the boom assembly 163 comprises the large boom 160 and the dipper stick 170 for installing a spigot end (e.g. 405b) into a bell end (e.g. 410b) of a pipe (as shown in step 640). The method may further comprise, as shown in step 643, receiving a depth to the surface signal by the controller 240 from a radar sensor 450 coupled to one or more of the implement 185 and the boom assembly 163, and creating the input signal 280 for modification of a direction of movement 199 or position 197 of the boom assembly 163 based on the depth to the surface signal. Finally, a location determining receiver 490 may generate location data 495 based upon positioning of the first pipe 220 as shown in step 657, and the controller 240 may receive and store the location data 495, corresponding to a unique identifier 485 for the first pipe, in a storage medium 480.

For added precision, in step 650, the method may further comprise receiving a target signal by a target signal 460 reader 455 coupled to one or more of the implement 185, the boom assembly 163, and the first pipe 220, from a target signal emitter 475 coupled to the second pipe 230; sending the target signal 460 to the controller 240, and creating an input signal 280 for modification of a direction of movement 199 or position 197 of the boom assembly 163 wherein the target signal 460 indicates the first pipe 220 and the second pipe 230 are in alignment. Note that the positioning of the target signal emitter 475 and the target signal reader 455 may be switched wherein the target signal emitter 475 is placed on the first pipe 220 and the target signal reader 455 is placed on the second pipe 230, thereby reaching the same end result. If the target signal reader 455 is centered as is step 655, the process may reiterate to a next step 690 either digging more of a trench with a bucket 690, or placement of a next pipe 615. If the target receiver is too high, as in step 665, the excavator may nudge the pipe down. If the target receiver is too low, as in step 675, workers at the site may be notified to assist in modifying any grading associated with the gravel.

The visual feedback 275 may perform as a guide for movement (e.g. a visual feed, or an overlay on a live visual feed) and the operator may manually adjust accordingly. Alternatively, an input signal 280 may be created for automatically modifying a direction of movement 199 or position 197 based on the visual data 210. The operator may have an override capacity to manually adjust if required.

Note that in the above "data" may be derived from a "signal".

Note that in the above "stereo-camera" may comprise of any image-capturing system or device, including thermal, lidar, radar, FLIR, and video type feed.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A pipe-laying system for assessing an environment and placing of a first pipe relative to a second pipe in a trench, the pipe-laying system comprising:
   a frame, the frame rotatably mounted to a ground-engaging mechanism, the ground-engaging mechanism adapted to support the frame on a surface;
   a boom assembly coupled to the frame, the boom assembly including:
      a large boom pivotally coupled to the frame and moveable relative to the frame by a first actuator;
      a dipper stick pivotally coupled to the large boom and moveable relative to the large boom by a second actuator;
   an implement detachably coupled to the dipper stick and moveable relative to the dipper stick through a third actuator, the implement adapted to detachably engage the first pipe;
   at least one sensor operable to sense one or more of a position and a direction of movement of one or more of the large boom, the dipper stick, and the implement, the at least one sensor creating one or more of a position signal and a direction of movement signal;
   at least one stereo camera coupled to one or more of the implement, the boom assembly, and the frame, the stereo camera adapted to obtain a visual data and generate a corresponding a visual data signal, wherein the at least one stereo camera is separate from the at least one sensor; and
   a controller adapted to:
      receive the visual data signal from the at least one stereo camera;
      identify at least one parameter of the first pipe relative to the second pipe;
      receive one or more of a position signal and a direction of movement signal from the at least one sensor;
      associate the visual data with one or more of the corresponding position data and direction of movement data; and
      create one or more of a visual feedback to an operator with the at least one parameter of the first pipe relative to the second pipe identified, and an input signal for modification of one or more of the position and the direction of movement of the boom assembly.

2. The pipe-laying system of claim 1, wherein the at least one parameter of the first pipe relative to the second pipe comprises identifying a first edge relative to a second edge.

3. The pipe-laying system of claim 1, wherein the at least one parameter of the first pipe relative to the second pipe comprises identifying a first central axis relative to a second central axis.

4. The pipe-laying system of claim 1, wherein the at least one parameter of the first pipe relative to the second pipe comprises identifying a first centerline relative to a second centerline.

5. The pipe-laying system of claim 1, wherein the at least one parameter of the first pipe relative to the second pipe comprises identifying a first average distance from a trench surface relative to a second average distance from a trench surface.

6. The pipe-laying system of claim 1, wherein the at least one parameter of the first pipe relative to the second pipe comprises identifying a first bell end of the first pipe and a second bell end of the second pipe.

7. The pipe-laying system of claim 1, further comprising:
   a target signal reader coupled to one or more of the implement, the boom assembly and the first pipe, the target reader receiving a target signal from a target signal emitter coupled to the second pipe,
   wherein the target signal reader indicates when the first pipe and the second pipe are in alignment.

8. The pipe-laying system of claim 1, wherein the controller further comprises:
   a storage medium adapted to store in memory one or more of the visual data and a corresponding position data with a unique identifier for the first pipe.

9. The pipe-laying system of claim 8, further comprising:
   a location-determining receiver, the location-determining receiver adapted to generate a location data signal upon positioning of the first pipe, the storage medium adapted to store the location data corresponding to the unique identifier for the first pipe.

10. The pipe-laying system of claim 1, further comprising:
    a radar sensor coupled to one or more of the implement and the boom assembly, the radar sensor indicating a depth to the surface.

11. A pipe-laying system for assessing an environment and placing of a first pipe relative to a second pipe in a trench, the pipe-laying system comprising:
    a frame, the frame rotatably mounted to a ground-engaging mechanism, the ground-engaging mechanism adapted to support the frame on a surface;
    a boom assembly coupled to the frame, the boom assembly including:
       a large boom pivotally coupled to the frame and moveable relative to the frame by a first actuator;
       a dipper stick pivotally coupled to the large boom and moveable relative to the large boom by a second actuator;
    an implement detachably coupled to the dipper stick and moveable relative to the dipper stick through a third actuator, the implement adapted to detachably engage the first pipe;
    at least one sensor operable to sense one or more of a position and a direction of movement of one or more of the large boom, the dipper stick, and the implement;
    a target signal reader coupled to one or more of the implement, the boom assembly and the first pipe, the target reader receiving a target signal from a target signal emitter coupled to the second pipe, wherein the target signal reader indicates when the first pipe and the second pipe are in alignment a controller adapted to:
receive one or more of a position signal and a direction of movement signal from the at least one sensor;
associate the target signal with one or more of the corresponding position data and direction of movement data;
create an input signal for modification of one or more of the direction of movement and the position of the boom assembly such that the first pipe and the second pipe are in alignment.

12. A method of assessing an environment and placing a first pipe relative to a second pipe in a trench by an excavator, the method comprising:
receiving a visual data signal by a controller on the excavator from at least one stereo camera, the at least one stereo camera coupled to one or more of a frame, a boom assembly, and an implement on the excavator, the boom assembly including a large boom and a dipper stick;
identifying at least one parameter by the controller of the first pipe relative to the second pipe;
receiving one or more of a position signal and a direction of movement signal by the controller from at least one sensor, the at least one sensor operable to sense one or more of a position and a direction of movement of one or more of the large boom, the dipper stick, and the implement, wherein the at least one sensor is separate from the at least one stereo camera;
associating a visual data with one or more of the corresponding position data and the direction of movement data;
creating one or more of a visual feedback to an operator with the at least one parameter of the first pipe relative to the second pipe identified and an input signal for modifying one or more of the direction of movement and the position of one or more of the large boom, the dipper stick, and the implement.

13. The method of claim 12, wherein the at least one parameter of the first pipe relative to the second pipe comprises identifying a first edge relative to a second edge.

14. The method of claim 12, wherein the at least one parameter of the first pipe relative to the second pipe comprises identifying a first central axis relative to a second central axis.

15. The method of claim 12, wherein the at least one parameter of the first pipe relative to the second pipe comprises identifying a first centerline relative to a second centerline.

16. The method of claim 12, wherein the at least one parameter of the first pipe relative to the second pipe comprises identifying a first average distance from a trench surface relative to a second average distance from the trench surface.

17. The method of claim 12, wherein the at least one parameter of the first pipe relative to the second pipe comprises identifying a first bell end of the first pipe and a second bell end of the second pipe.

18. The method of claim 12 further comprising:
receiving a target signal by a target signal reader coupled to one or more of the implement, the boom assembly, and the first pipe, from a target signal emitter coupled to the second pipe;
sending the target signal to the controller; and
creating the input signal for modification of one or more of a direction of movement and position of the boom assembly wherein the target signal indicates the first pipe and the second pipe are in alignment.

19. The method of claim 12, further comprising:
receiving a depth to the surface signal by the controller from a radar sensor coupled to one or more of the implement and the boom assembly, and
creating the input signal for modification of one or more of the direction of movement and the position of the boom assembly based on the depth to the surface signal.

20. The method of claim 12, further comprising:
generating a location data upon by a location determining receiver upon positioning of the first pipe; and
receiving and storing the location data corresponding to a unique identifier for the first pipe by a storage medium.

* * * * *